United States Patent [19]
Gaskins

[11] Patent Number: 5,657,457
[45] Date of Patent: Aug. 12, 1997

[54] METHOD AND APPARATUS FOR ELIMINATING BUS CONTENTION AMONG MULTIPLE DRIVERS WITHOUT PERFORMANCE DEGRADATION

[75] Inventor: Darius D. Gaskins, Austin, Tex.

[73] Assignee: Dell USA, L.P., Round Rock, Tex.

[21] Appl. No.: 189,226

[22] Filed: Jan. 31, 1994

[51] Int. Cl.$^6$ .................................................. G06F 13/14
[52] U.S. Cl. ...................... 395/287; 364/271; 364/271.2; 364/271.5; 364/DIG. 1
[58] Field of Search ........................... 395/325, 550, 395/275, 650, 287, 200.19, 200.06, 299, 800; 340/825.14, 825.5; 370/85.2, 100.1; 307/269

[56] References Cited

U.S. PATENT DOCUMENTS

| | | | |
|---|---|---|---|
| 4,375,639 | 3/1983 | Johnson, Jr. | 340/825.5 |
| 4,779,089 | 10/1988 | Theus | 340/825.5 |
| 4,807,109 | 2/1989 | Farrell et al. | 395/325 |
| 5,210,871 | 5/1993 | Lala et al. | 395/650 |
| 5,218,692 | 6/1993 | Yamada et al. | 395/550 |
| 5,291,070 | 3/1994 | Witt | 307/269 |
| 5,371,880 | 12/1994 | Bhattacharya | 395/550 |

*Primary Examiner*—Gopal C. Ray

[57] ABSTRACT

A method and apparatus for eliminating bus contention among multiple drivers in a computer system by synchronizing the output enables of all of the respective drivers within the system to the system bus clock. This synchronization eliminates the variation between the output enables across the system and thus ensures that there is no difference between the best case output enable time and the worst case output disable time. In this manner, the potential for bus contention between drivers is eliminated. In the preferred embodiment of the invention various methods may be used to synchronize a respective device's output enables to the system bus clock. The logic device which actually generates the system bus clock preferably uses a clock correlation method which matches various delays within the device to synchronize the output enables throughout the device. Other devices preferably use either digital phase locked loop (PLL) methods or digital delay correlation methods to synchronize their respective output enables. Digital delay correlation involves delay chain logic which generates an early clocking signal referred to as pCLK that is asserted a certain number of delays prior to the CLK signal rising edge. This early clocking signal is used to synchronize the output enables of the device to the CLK signal rising edge.

11 Claims, 5 Drawing Sheets

FIGURE 1

CLOCK CORRELATION

FILTER

METHOD AND APPARATUS FOR ELIMINATING BUS CONTENTION AMONG MULTIPLE DRIVERS WITHOUT PERFORMANCE DEGRADATION

FIELD OF THE INVENTION

The present invention relates to bus operations in computer systems, and more particularly to a method for eliminating contention between multiple drivers on a common bus in a computer system without impacting system performance.

DESCRIPTION OF THE RELATED ART

Modern computer systems typically include many hardware components that are connected via one or more computer buses. For example, modern personal computer systems typically include a proprietary memory or host bus connecting the CPU and main memory as well as a separate expansion bus for optional peripheral I/O cards. In addition, several new local bus standards have been developed wherein a local bus directly connects to the processor's local bus. Hardware devices located on a respective bus communicate with other devices situated on the bus by asserting various signals over the bus to the other device. In general, a plurality of different hardware devices on a bus will have the ability to assert respective signals such as address lines, data lines, and control lines to communicate with other devices situated on the bus.

Bussed signals which have multiple sources generally require special design considerations to avoid contention between multiple drivers. Bus contention refers to two hardware sources attempting to assert the same signals simultaneously on the bus. It is important that bus contention be prevented from occurring because it causes reliability problems in the computer system, increases system power consumption, and adversely impacts propagation delays which are relied on by other devices. The most common example of bus contention is where one hardware element asserts signals on the bus prior to a previous hardware element disabling its outputs and discontinuing driving the same signals onto the bus. Thus to avoid bus contention it is important to ensure that a device not drive the system bus until the prior device has completed communication and has disabled its drivers.

Prior art computer systems have typically eliminated bus contention by enforcing a finite "dead" time on bussed signals. In other words, prior art systems have eliminated driver contention problems by adding an extra clock cycle between the de-assertion of one device's drivers and the assertion of another device's drivers. During this "dead" time no drivers are active, and thus no bus communication is allowed during this time. The actual dead time required is typically determined by the difference between the best case output enable time and the worst case output disable time. If the worst case output disable time is greater than the best case output enable time, then it is possible that a prior device may still be driving the bus when a second device enables its output drivers. Therefore, the difference between these two is the time required for "dead" time to ensure that no data contention problems can occur.

The requirement that a finite "dead" time be inserted between every transaction on a computer's bus reduces computer system performance because no meaningful bus operations can take place during this time. Therefore, an improved method and apparatus is desired which eliminates bus contention between multiple drivers without the performance degradation associated with prior art methods.

SUMMARY OF THE INVENTION

The present invention comprises a method and apparatus for eliminating bus contention among multiple drivers in a computer system by synchronizing the output enables of all of the respective drivers within the system, preferably to the system bus clock. This synchronization eliminates the variation between the output enables across the system and thus ensures that there is no difference between the best case output enable time and the worst case output disable time. In this manner, the potential for bus contention between drivers is eliminated.

In the preferred embodiment of the invention various methods may be used to synchronize a respective device's output enables to the system bus clock. The logic device which actually generates the system bus clock preferably uses a clock correlation method. According to this method all of the individual elements within the device are tuned via transistor sizes to have the same delay. Also, during design of the device, place and route tools are used to match various delays within the device to synchronize the output enables throughout the device to the system clock. This clock correlation method can only be used in the device where the system clock is generated because the delay in generating the clock is used to match the delay in generating the output enable.

Other devices preferably use either digital phase locked loop (PLL) methods or digital delay correlation methods to synchronize their respective output enables. Digital PLLs differ from analog PLLs in that they utilize a digital delay circuit in place of the voltage controlled oscillator found in analog PLLs. The digital delay circuit delays the input clock, and feedback is used to adjust the delay such that the output is phase locked to the input. Digital delay correlation involves delay chain logic which determines the propagation speed of the CLK signal through elements within the device and uses this information to generate an early clocking signal referred to as pCLK. The pCLK signal is asserted a certain number of delays prior to the CLK signal rising edge and is used to synchronize the output enables of the respective device to the CLK signal rising edge.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
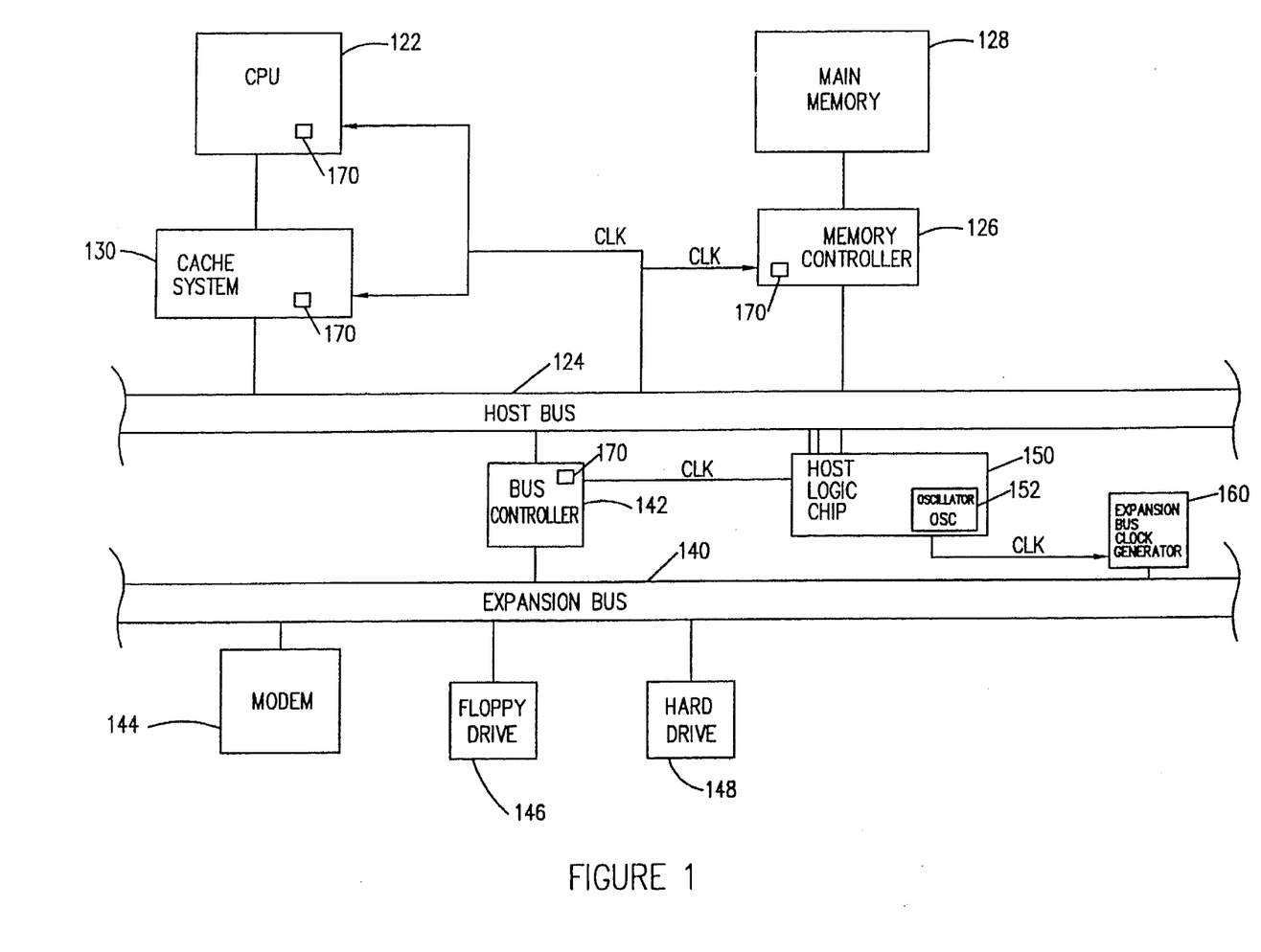
FIG. 1 is a block diagram of a computer system incorporating the present invention.

Referring now to FIG. 1, a computer system incorporating logic according to the present invention to reduce bus contention among multiple drivers of a common bus is shown. The elements of a computer system not necessary to understand the operation of the present invention have been omitted for simplicity. The computer system includes a central processing unit or CPU 122 which is coupled to a memory or host bus 124. A CPU cache system 130 is preferably coupled between the CPU 122 and the host bus 124. The cache system 130 comprises cache memory and a cache controller. The host bus 124 includes address, data, and control portions. Main memory 128 is coupled to the host bus 124 by means of memory controller 126. The host bus 124 is coupled to an expansion or input/output (I/O) bus 140 by means of a bus controller 142. The expansion bus 140 includes slots for various other devices, including video 144, a floppy drive 146 and hard drive 148, as desired.

A device referred to as the host logic chip 150 is also coupled to the host bus 124 as shown. The host logic chip 150 performs various miscellaneous functions, including system clock generation for the computer system. The host logic chip includes an oscillator 152 of a certain frequency which is used to generate the system clock signal, referred to as CLK. The host logic chip 150 also includes sufficient buffering for driving the CLK signal to various devices in the computer system. As shown, the host logic chip 150 drives the CLK signal to the CPU 122, cache system 130, memory controller 126, bus controller 142 and expansion bus clock generation logic 160. The expansion bus generation logic 160 receives the CLK signal and uses this signal to generate an expansion bus clock signal, typically at a different frequency.

According to the present invention each of the devices coupled to the host bus 124 synchronize their output enables to a common signal to prevent bus contention from occurring. Synchronization of the output enables of each device coupled to the host bus guarantees that each device enables signals onto the bus at a specified point in time, i.e., this synchronization eliminates the variation between the output enables across the system. This synchronization also guarantees that the output disables do not vary among devices situated on the bus. Thus there is no difference between the best case output enable time and worst case output disable time, and the possibility of bus contention is eliminated.

In the preferred embodiment the various host bus devices each include logic which synchronizes their respective output enables to the CLK signal. As shown, the CPU 122, cache system 130, memory controller 126, and bus controller 142 each include synchronization logic 170 according to the present invention which synchronizes the respective output enables to the CLK signal, preferably the rising edge of the CLK signal.

It is noted that the various devices can synchronize their output enables to any common signal, and synchronization to CLK signal is simply the preferred embodiment of the invention. Also, other devices (not shown) connected to the host bus 124 will also preferably have logic for synchronizing their respective output enables to the CLK signal. Further, the present invention of synchronizing the output enables of various devices connected to a bus to a common signal to prevent bus contention among the devices may be used on any type of computer bus, including the host bus 124, expansion bus 140, and any type of local bus (not shown), among others.

In the preferred embodiment of the invention various methods may be used to synchronize the output enables of the various respective devices to the CLK signal. The device which drives the CLK signal, the host logic chip 150 in the preferred embodiment, preferably uses a clock correlation method. The clock correlation method uses delay matching techniques to synchronize output enables to the CLK signal and thus is simple and reliable. However, this method can only be used by the device that generates the CLK signal because only it has an early version of the clock with which to match delays. Furthermore, because different chips may be operating under different voltage, temperature and pressure parameters, delays can only be matched to one another within a chip, and the delays within a chip cannot be matched to delays external to the chip. Thus the host logic chip 150 uses this method, and the remaining devices use other methods, preferably either a digital PLL method or a digital delay correlation method, both of which compensate for voltage, temperature and pressure, as discussed below.

Figure 2:
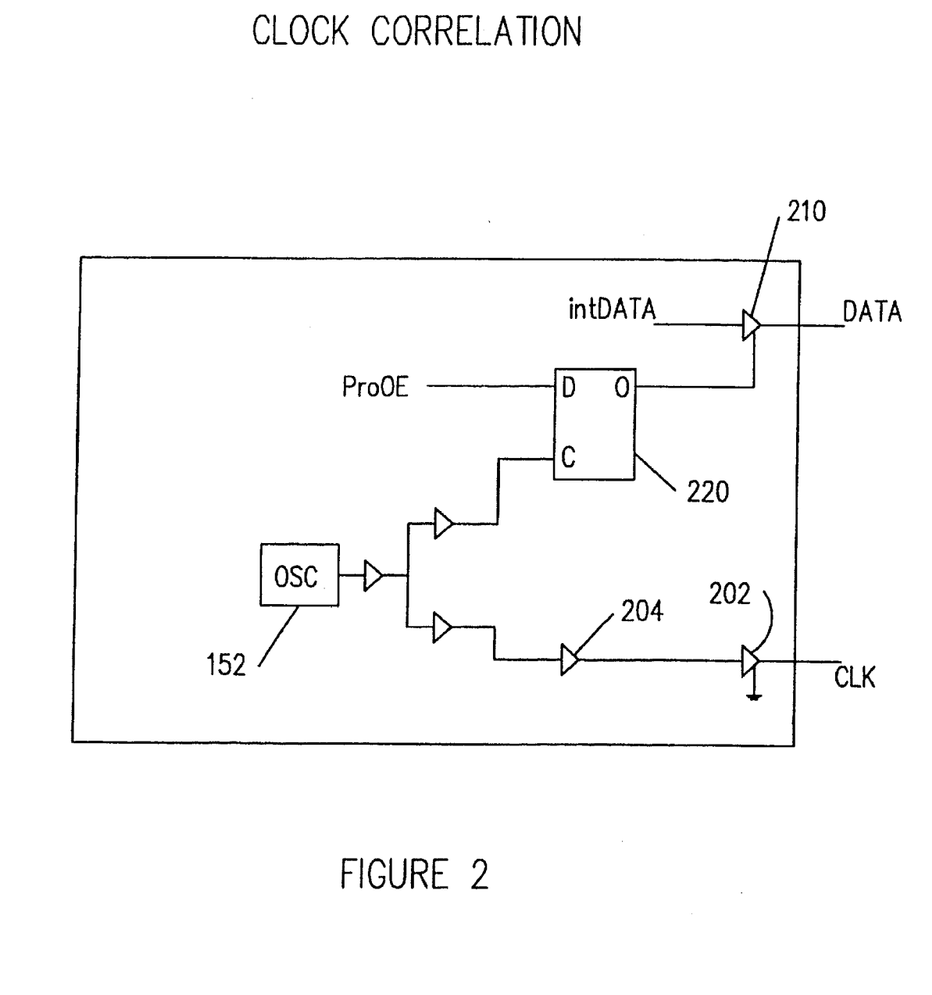
FIG. 2 illustrates clock correlation in the host logic chip of FIG. 1.

In the clock correlation method all of the individual elements within the host logic chip 150 are tuned via transistor sizes to have the same delay. Also, place and route tools used in designing the device are used to match various delays within the device to synchronize the output enables to the rising edge of the CLK signal. In this manner, data is output at the same time as the rising edge of the CLK signal. Referring now to FIG. 2, an example of clock correlation being used to synchronize an output enable to the rising edge of the CLK signal is shown. As shown, the oscillator 152 provides its output through a buffering tree to a final buffer 202 where the CLK signal is generated. The data output enable buffer 210 is placed and routed as shown to be synchronous with the rising edge of the CLK signal. As shown, an output enable setup signal referred to as PreOE is connected to the D input of a D-type flip-flop 220. The clock input of the flipflop 220 is connected to a buffered output of the oscillator 152. The Q output of the flipflop 220 is connected to the enable input of the output enable buffer 210. Internal data that is to be presented on the bus 125, referred to as intDATA, is connected to the input of the output enable buffer 210. This data is presented onto the bus as signals referred to as DATA. As shown, the delay imposed by the flip-flop 220 is matched by the delay element 204, and the delay imposed by the output enable buffer 210 is matched by the CLK signal buffer 202. These delays are matched within the device such that data is output to the bus synchronously with the rising edge of the CLK signal. Likewise all of the output enable buffers in the host logic chip 150 are placed and routed such that the respective signals are enabled onto the bus synchronously with the rising edge of the CLK signal. As previously discussed, the clock correlation method can only be used in the device where the system clock is generated, and thus the remaining devices use other methods discussed below.

For other devices such as the CPU 122, cache system 130, memory controller 126, bus controller 142, etc., the synchronization logic 170 preferably uses either digital phase locked loop (PLL) methods or digital delay correlation methods to synchronize the respective output enables. Digital delay correlation is slightly preferred due to its simplicity. However, digital PLL methods may offer greater reliability. It is also noted that other methods may be used to synchronize the output enables of the respective devices to the CLK signal, as desired.

Digital PLLs differ from analog PLLs in that they utilize a digital delay circuit in place of the voltage controlled oscillator found in analog PLLs. The digital delay circuit delays the input clock, and feedback is used to adjust the delay such that the output is phase locked to the input. In this manner, digital PLLs can be used to synchronize the output enables of a device to the CLK signal. Since the operation of digital PLLs to synchronize signals is well known to those skilled in the art, details of their operation are omitted for simplicity.

Figure 3:
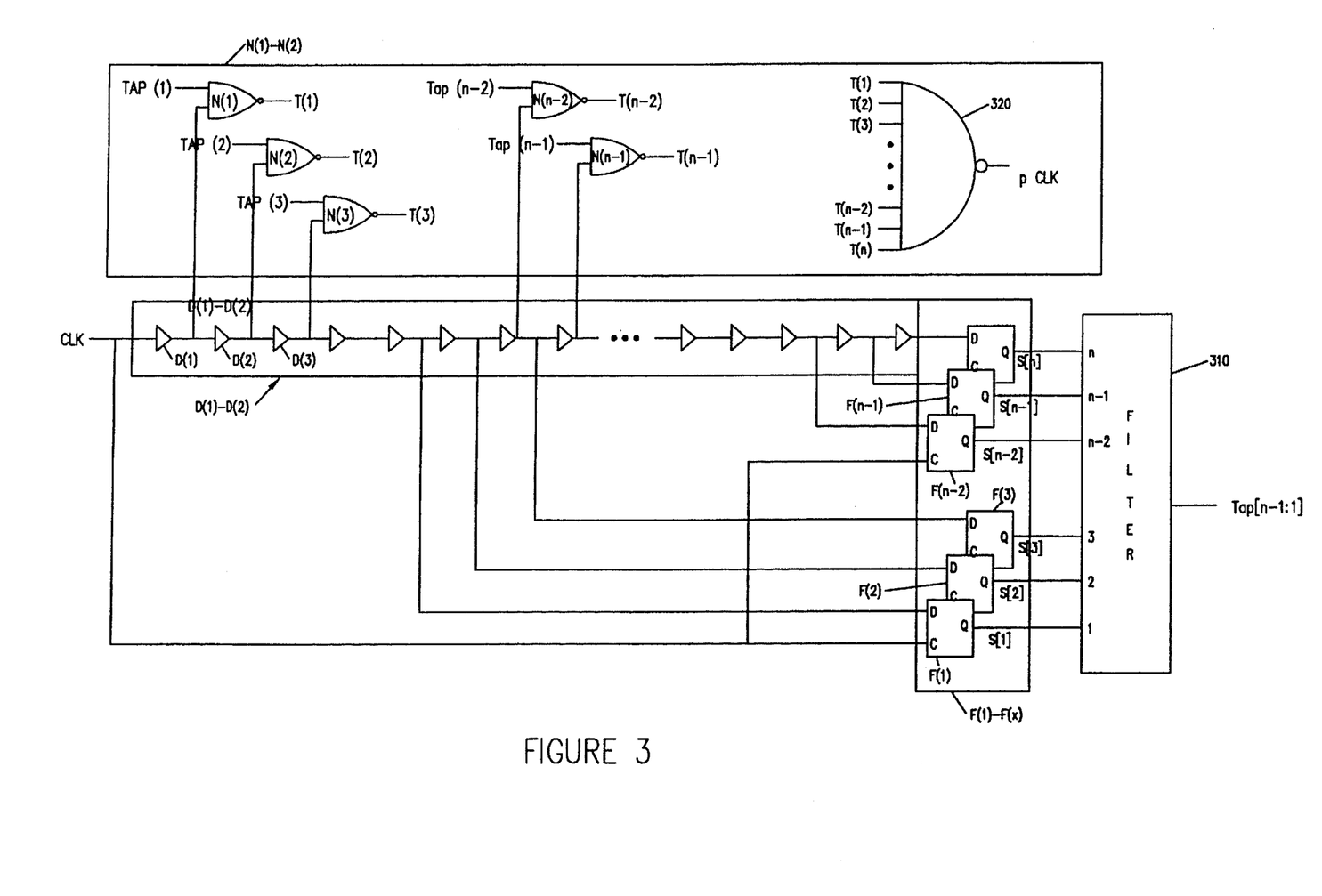
FIG. 3 illustrates digital delay correlation logic for generating an early clocking signal used in synchronizing the output enables of a device according to the present invention.

Digital delay correlation is an alternate and currently preferred method of synchronizing the output enables of a device. Referring now to FIG. 3, digital delay correlation logic according to one embodiment of the invention is shown. In the embodiment shown in FIG. 3, the digital delay correlation logic generates an early clocking signal referred to as pCLK. The pCLK signal rising edge is designed to occur 2 delays prior to the next rising edge of the CLK signal. In this manner the pCLK signal can be used to correlate the device's output enables to the rising edge of the CLK signal.

As shown in FIG. 3, the digital delay correlation logic includes a chain of delay elements D(1)–D(z) connected together whereby the output of one delay element is connected to the input of the next delay element and so on. In one embodiment, 20 delay elements D1–D20 are used which each provide a 1 ns delay, under best operating conditions. However, more or less delay elements may be used depending on the desired degree of precision, the amount of delay provided by each delay element, and the timing of the system clocking signal with which synchronization is desired.

The CLK signal is connected to the input of the first delay element D1, as shown. The outputs of a subset of the delay elements D(1)–D(z) are connected to the D inputs of corresponding D-type synchronizing flip-flops F(1)–F(n) as shown. The outputs of a first number of the delay elements D(1)–D(z) are not connected to corresponding D-type flip-flops because it is assumed that the CLK signal rising edge will propagate past a first number of the delay elements before the next CLK signal rising edge. The CLK signal is connected to the clock input of each of the flip-flops F(1) –F(n). The Q outputs of each of the flip-flops F(1)–F(n) are connected to a filter 310 which determines the point where the earliest CLK signal rising edge has propagated through the delay chain at the subsequent CLK signal rising edge. This value is provided as an output referred to as TAP[n–1:1], where one of the TAP signals is asserted high to indicate the CLK signal rising edge and the remaining TAP signals are negated low. The TAP[n-1:1] signals are each connected to one input of respective NAND gates N(1)–N(n–1). The other input of each of the NAND gates N(1)–N(n–1) is connected to outputs of respective delay elements, as shown. As shown in FIG. 3, the respective delay element whose output is provided to a respective NAND gate N(a) is four delay elements earlier in the chain than the delay element whose output is provided to the corresponding flip-flop F(a). The outputs of each of the NAND gates N(1)–N(n–1) are provided as inputs to an n input NAND gate 320. The output of the NAND gate 320 is the pCLK signal.

The logic comprising delay elements D(1)–D(z), flip-flops F(1)–F(n), and filter 310 is used to determine the point in time when the last rising edge of the CLK signal occurred. The rising edge of the CLK signal flows through the delay chain, and on the next rising edge of the CLK signal the depth to which the CLK signal has propagated is determined.

The delay chain thus encodes the speed of the device relative to the CLK signal. The NAND gates N(1)–N(n–1) use this encoded information to create the pCLK signal. The rising edge of the pCLK signal precedes the next rising edge of the CLK signal by 2 buffer delays. These two buffer delays are generated by placement of the respective NAND gates four delays earlier in the delay chain minus the delay provided by the two levels of NAND gates.

For more information on the operation of the digital delay correlation logic, please see U.S. patent application Ser. No. 07/810,313 filed Dec. 30, 1991 and titled "Integrated Delay Line," which is by the same inventor and assigned to the same assignee as the present application, which is hereby incorporated by reference. For additional discussion of use of the delay chain in FIG. 3 in other applications, please see related copending applications Ser. No. 08/102,446 filed Aug. 5, 1993 and titled "Method and Apparatus for Synchronous Bus Interface Optimization," and Ser. No. 08/089,873 filed Jul. 12, 1993 and titled "Method and Apparatus for State Machine Optimization using Device Delay Characteristics," which are both assigned to the same assignee as the present application and are hereby incorporated by reference.

Figure 4:
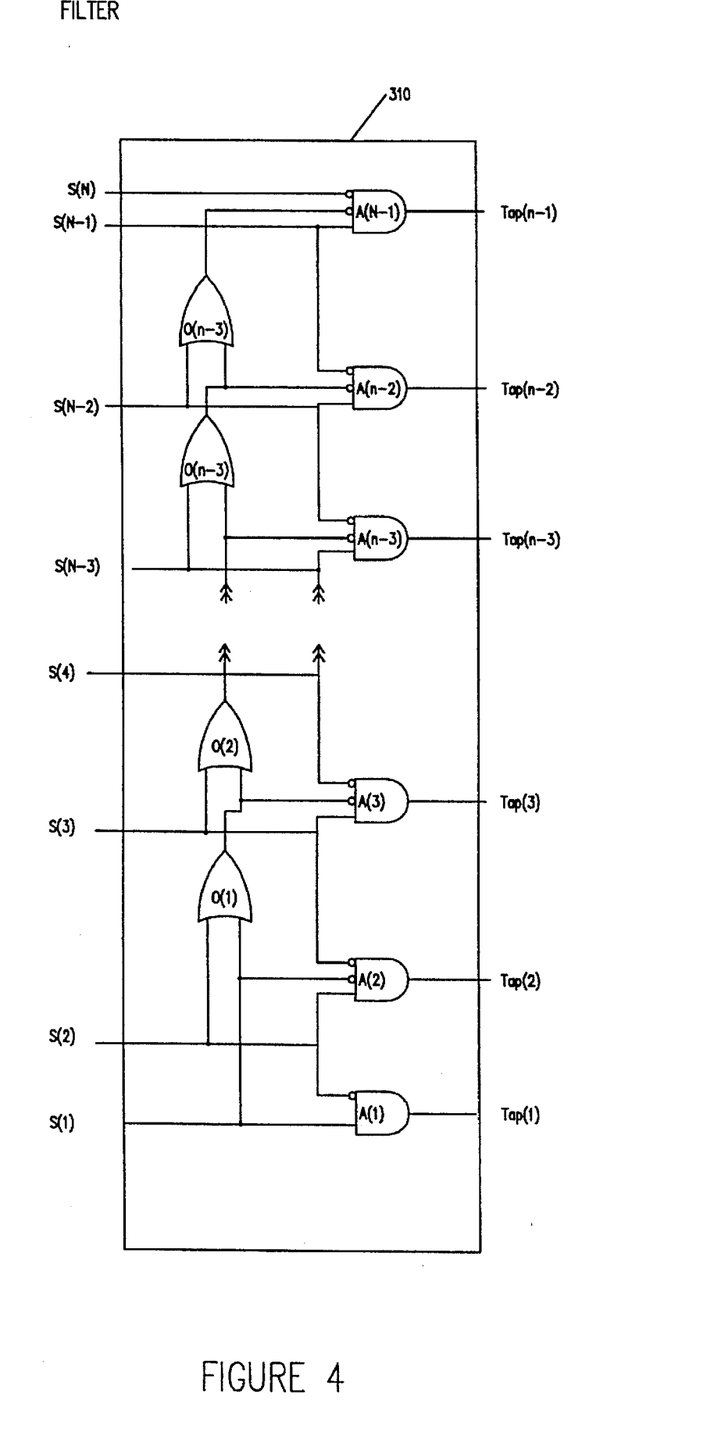
FIG. 4 illustrates logic comprised in the filter of FIG. 3.

Referring now to FIG. 4, an example of logic that can be used to implement the operation of the filter 310 is shown. As previously discussed, the purpose of the filter 310 is to determine at which delay element the CLK signal rising edge has propagated at the subsequent CLK signal rising edge. As shown in FIG. 4, the filter 310 comprises a plurality of AND gates A(1)–A(n–1). In FIG. 4 only a portion of the logic is shown for simplicity. The AND gate A(1) is a two input AND gate, whereas the AND gates A(2)–A(n–1) are three input AND gates. The S(1)–S(n–1) inputs of the corresponding AND gates A(1)–A(n–1). The S(2)–S(n–1) signals are connected to inverted inputs of the next lower numbered AND gate, gates A(1)–A(n–2). For example, the S(2) signal is connected to an inverted input of the A(1) AND gate, the S(3) signal is connected to an inverted input of the A(2) AND gate, and so on. The S(1) signal is connected to an inverted input of the AND gate A(2). The S(1) and S(2) signals are connected to inputs of a two input OR gate, O(1), whose output is connected to an inverted input of the AND gate A(3). The output of the O(1) OR gate and the S(3) signal are connected to inputs of an OR gate O(2), whose output is connected to an inverted input of the AND gate A(4) (not shown). Likewise, for a respective AND gate A(x), the gate includes an inverted input which receives the output of an OR gate whose inputs are the signal S(x–1) and the output of a prior OR gate. This logic analyzes the sequence of 0's and 1's latched by the D-type flip-flops F(1)–F(n) and determines where the rising edge of the CLK signal has propagated at the subsequent CLK signal rising edge. Various other logic implementations may be used to perform this filtering process, as would be well known in the art.

Figure 5:
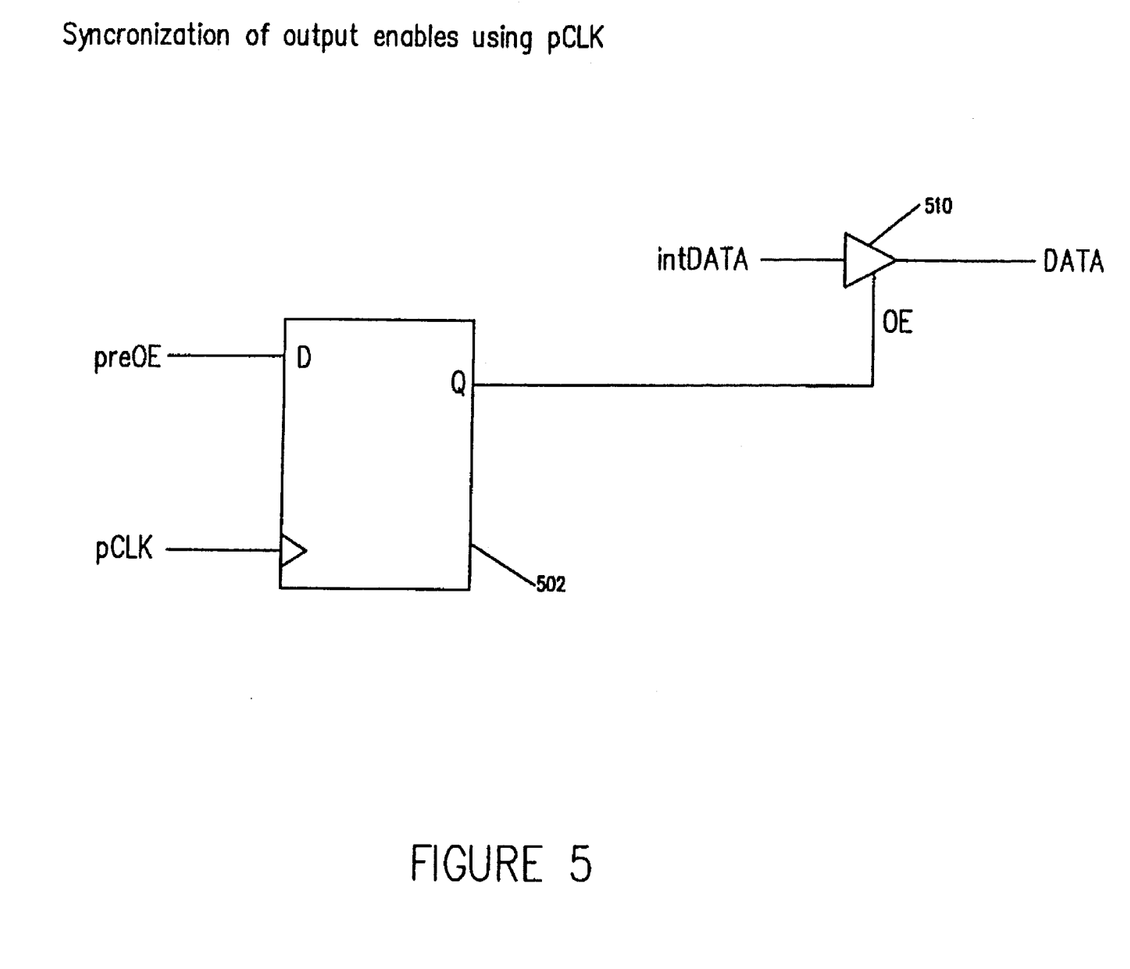
FIG. 5 illustrates use of the pCLK signal generated by the digital delay correlation logic of FIG. 3 to synchronize the output enables of a device.

Referring now to FIG. 5, the pCLK signal is connected to the clock input of a D-type flip-flop 502. The D input of the flip-flop receives a pre-output enable signal referred to as preOE. The Q output of the flip-flop is connected to an output enable buffer 510. The internal DATA to be output from the device, referred to as intDATA, is connected to the input of the buffer 510, and the output of the buffer 510 is data that is output onto the bus. As previously mentioned, the pCLK signal rising edge occurs two delays prior to the CLK signal rising edge. Thus, the data is output onto the bus synchronously with the rising edge of the CLK signal because the flip-flop 502 and buffer 510 provide two delays after assertion of the pCLK signal and prior to enabling signals onto the bus. In this manner all of the output enables of a device are synchronized to the rising edge of the CLK signal.

Therefore, a method and apparatus for preventing bus contention without any negative effects on system performance is disclosed. According to the invention, each of the devices connected to the bus have their output enables synchronized to a common signal, preferably the rising edge of the system clock signal. This eliminates any variation between output enables in the system and thus also eliminates any variation in the output disables. Thus bus contention is eliminated without any adverse impact on system performance.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system with reduced bus contention among multiple drivers of a common bus, comprising:

a bus;

a signal generating device coupled to said bus and configured to generate a common signal;

a first device coupled to said bus and configured to receive said common signal from said signal generating device, said first device including output enable buffers coupled to said bus, said output enable buffers configured to drive said bus, said first device further comprising synchronizing logic configured to synchronize said output enable buffers with said common signal; and a second device coupled to said bus and configured to receive said common signal from said signal generating device, said second device including output enable buffers coupled to said bus, said output enable buffers configured to drive said bus, said second device further comprising synchronizing logic configured to synchronize said output enable buffers with said common signal;

wherein said first and second devices each include a best case output enable time and a worst case output disable time, wherein said synchronized output enables of said first and second devices prevent bus contention between said first and second devices by reducing the difference between the best case output enable times and worst case output disable times of said first and second devices.

2. The computer system of claim 1, wherein said signal generating device comprises clock generation logic and said common signal is a system clocking signal.

3. A computer system with reduced bus contention among multiple drivers of a common bus, comprising:

a bus;

a signal generating device coupled to said bus and configured to generate a common signal;

a first device coupled to said bus and configured to receive said common signal from said signal generating device, said first device including output enable buffers coupled to said bus, said output enable buffers configured to drive said bus, said first device further comprising synchronizing logic configured to synchronize said output enable buffers with said common signal; and a second device coupled to said bus and configured to receive said common signal from said signal generating device, said second device including output enable buffers coupled to said bus, said output enable buffers configured to drive said bus, said second device further comprising synchronizing logic configured to synchronize said output enable buffers with said common signal;

wherein said first and second devices each include a best case output enable time and a worst case output disable time, wherein said synchronized output enables of said first and second devices prevent bus contention between said first and second devices by reducing the difference between the best case output enable times and worst case output disable times of said first and second devices;

wherein said synchronizing logic in said first device comprises a digital phase locked loop.

4. A computer system with reduced bus contention among multiple drivers of a common bus, comprising:

a bus;

a signal generating device coupled to said bus and configured to generate a common signal;

a first device coupled to said bus and configured to receive said common signal from said signal generating device, said first device including output enable buffers coupled to said bus, said output enable buffers configured to drive said bus, said first device further comprising synchronizing logic configured to synchronize said output enable buffers with said common signal; and a second device coupled to said bus and configured to receive said common signal from said signal generating device; said second device including output enable buffers coupled to said bus, said output enable buffers configured to drive said bus, said second device further comprising synchronizing logic configured to synchronize said output enable buffers with said common signal;

wherein said first and second devices each include a best case output enable time and a worst case output disable time, wherein said synchronized output enables of said first and second devices prevent bus contention between said first and second devices by reducing the difference between the best case output enable times and worst case output disable times of said first and second devices;

wherein said synchronizing logic in said first device comprises a digital delay correlation circuit configured to generate an early version of said common signal, wherein said early version of said common signal is used to synchronize said output enable buffers of said first device with said common signal.

5. A computer system with reduced bus contention among multiple drivers of a common bus, comprising:

a bus;

a signal generating device coupled to said bus and configured to generate a common signal, wherein said signal generating device comprises clock generation logic and said common signal is a system clocking signal;

a first device coupled to said bus and configured to receive said common signal from said signal generating device, said first device including output enable buffers coupled to said bus, said output enable buffers configured to drive said bus, said first device further comprising synchronizing logic configured to synchronize said output enable buffers with said common signal; and a second device coupled to said bus and configured to receive said common signal from said signal generating device, said second device including output enable buffers coupled to said bus, said output enable buffers configured to drive said bus, said second device further comprising synchronizing logic configured to synchronize said output enable buffers with said common signal;

wherein said first and second devices each include a best case output enable time and a worst case output disable time, wherein said synchronized output enables of said first and second devices prevent bus contention between said first and second devices by reducing the difference between the best case output enable times and worst case output disable times of said first and second devices;

wherein said synchronizing logic in said first and second devices is configured to synchronize said output enable buffers to an edge of said system clocking signal.

6. The computer system of claim 5, wherein said synchronization logic in said first device comprises a digital delay correlation circuit configured to generate an early version of said system clocking signal, wherein said early version of said system clocking signal is used to synchronize said output enable buffers of said first device with said system clocking signal.

7. The computer system of claim 6, wherein said digital delay correlation circuit comprises:
   a chain of delay elements connected in a serial fashion, wherein the first delay element in said chain is configured to receive said system clocking signal as an input;
   a filter coupled to said chain of delay elements which is configured to generate information regarding a number of delay elements through which an edge of said system clocking signal has propagated at a subsequent system clocking signal edge; and
   encoder logic coupled to said filter which is configured to receive said filter information and is configured to use said filter information to generate said early version of said system clocking signal.

8. A computer system with reduced bus contention among multiple drivers of a common bus, comprising:
   a bus;
   a signal generating device coupled to said bus for generating a common signal;
   a first device coupled to said bus and receiving said common signal from said signal generating device, said first device including output enable buffers coupled to said bus for driving said bus, said first device further comprising synchronizing logic for synchronizing said output enable buffers with said common signal; and
   a second device coupled to said bus and receiving said common signal from said signal generating device, said second device including output enable buffers coupled to said bus for driving said bus, said second device further comprising synchronizing logic for synchronizing said output enable buffers with said common signal;
   wherein said first and second devices each include a best case output enable time and a worst case output disable time, wherein said synchronized output enables of said first and second devices prevent bus contention between said first and second devices by reducing the difference between the best case output enable times and worst case output disable times of said first and second devices;
   wherein said synchronizing logic in said first device comprises a digital phase locked loop.

9. A computer system with reduced bus contention among multiple drivers of a common bus, comprising:
   a bus;
   a signal generating device coupled to said bus for generating a common signal;
   a first device coupled to said bus and receiving said common signal from said signal generating device, said first device including output enable buffers coupled to said bus for driving said bus, said first device further comprising synchronizing logic for synchronizing said output enable buffers with said common signal; and
   a second device coupled to said bus and receiving said common signal from said signal generating device, said second device including output enable buffers coupled to said bus for driving said bus, said second device further comprising synchronizing logic for synchronizing said output enable buffers with said common signal;
   wherein said first and second devices each include a best case output enable time and a worst case output disable time, wherein said synchronized output enables of said first and second devices prevent bus contention between said first and second devices by reducing the difference between the best case output enable times and worst case output disable times of said first and second devices; and
   wherein said synchronizing logic in said first device comprises a digital delay correlation circuit which generates an early version of said common signal, wherein said early version of said common signal is used to synchronize said output enable buffers of said first device with said common signal.

10. A computer system with reduced bus contention among multiple drivers of a common bus, comprising:
    a bus;
    a signal generating device coupled to said bus for generating a common signal, wherein said signal generating device comprises clock generation logic and said common signal is a system clocking signal;
    a first device coupled to said bus and receiving said common signal from said signal generating device, said first device including output enable buffers coupled to said bus for driving said bus, said first device further comprising synchronizing logic for synchronizing said output enable buffers with said common signal; and
    a second device coupled to said bus and receiving said common signal from said signal generating device, said second device including output enable buffers coupled to said bus for driving said bus, said second device further comprising synchronizing logic for synchronizing said output enable buffers with said common signal;
    wherein said first and second devices each include a best case output enable time and a worst case output disable time, wherein said synchronized output enables of said first and second devices prevent bus contention between said first and second devices by reducing the difference between the best case output enable times and worst case output disable times of said first and second devices; and
    wherein said synchronizing logic in said first and second devices synchronizes said output enable buffers to an edge of said system clocking signal.

11. The computer system of claim 10, wherein synchronizing logic in said first device comprises a digital delay correlation circuit which generates an early version of said system clocking signal, wherein said early version of said system clocking signal is used to synchronize said output enable buffers of said first device with said system clocking signal.

* * * * *